United States Patent
Blaha et al.

[15] 3,656,913
[45] Apr. 18, 1972

[54] CATALYTIC REACTOR

[72] Inventors: Emil Blaha, Cheltenham; Maurice R. Kitzen, Elkins Park, both of Pa.

[73] Assignee: Selas Corporation, Dresher, Pa.

[22] Filed: Jan. 27, 1970

[21] Appl. No.: 6,254

[52] U.S. Cl. .................................................23/288 M, 48/196
[51] Int. Cl. .................................................B01j 9/04
[58] Field of Search ...............23/288 M, 288 L, 288 K, 277, 23/281, 289; 48/196

[56] References Cited

UNITED STATES PATENTS

| | | | |
|---|---|---|---|
| 2,805,229 | 9/1957 | Metzger | 23/288 M X |
| 2,904,502 | 9/1959 | Shapleigh | 23/288 M UX |
| 3,357,916 | 12/1967 | Smith | 23/288 M X |
| 2,293,946 | 8/1942 | Payne | 23/288 M X |
| 2,709,128 | 5/1955 | Krause | 23/288 M |
| 2,526,657 | 10/1950 | Guyer | 23/288 M |
| 2,778,610 | 1/1957 | Bruegger | 23/288 K X |
| 1,677,363 | 7/1928 | Olivier | 23/288 M UX |
| 3,334,971 | 8/1967 | James et al. | 23/288 M |
| 3,527,565 | 9/1970 | Banchik et al. | 23/288 M X |
| 3,348,923 | 10/1967 | Demarest | 23/288 M |

*Primary Examiner*—Joseph Scovronek
*Attorney*—E. Wellford Mason

[57] ABSTRACT

A catalytic reactor in which the catalyst is on the surface of a core that extends axially through the reactor tube to form an annular space through which the reactants flow.

5 Claims, 3 Drawing Figures

PATENTED APR 18 1972 3,656,913

INVENTOR.
EMIL BLAHA
MAURICE R. KITZEN
BY
*E. W. Mason*

CATALYTIC REACTOR

SUMMARY OF THE INVENTION

The present invention relates to the reforming of hydrocarbons, and more particularly to the production of a desirable reducing gas composition by reforming methane with steam under stoichiometric conditions and apparatus by which this can be effectively accomplished.

At the present time, in the reforming of hydrocarbons, such as natural gas with steam to produce hydrogen and carbon monoxide, it is customary to use a catalyst in the form of particles that are packed in an alloy tube. Such operation requires a minimum steam to carbon ratio of 2 to 1 which means at least 100 percent excess steam over theoretical requirements for complete reaction. This is required so that coke will not be produced to foul up operations.

When the products of reaction are used for metal reduction purposes, for example, products other than hydrogen and carbon monoxide, such as unreacted methane, carbon dioxide and steam represent inerts which effectively reduce the partial pressure of hydrogen and carbon monoxide and also act as coolants in a reducing reactor. In addition, the effluent from the reformer is frequently cooled to condense out the water vapor and reheated to temperature of use.

With the present invention a novel reformer configuration is used in which an unobstructed, annular flow of reactants is provided so that theoretical proportions of steam and methane can be used without danger of coking. If coking does occur, all coke will be accessible on the surface of a catalytic core forming the annular passage rather than in the interstices of the usual catalyst.

It is an object of the invention to provide a novel apparatus useful in steam-methane reforming. It is a further object of the invention to provide a catalytic reactor with a unique catalyst configuration.

The various features of novelty which characterize our invention are pointed out with particularity in the claims annexed to and forming a part of this specification. For a better understanding of the invention, however, its advantages and specific objects attained with its use, reference should be had to the accompanying drawings and descriptive matter in which we have illustrated and described a preferred embodiment of the invention. In the drawings:

DETAILED DESCRIPTION

Figure 1:
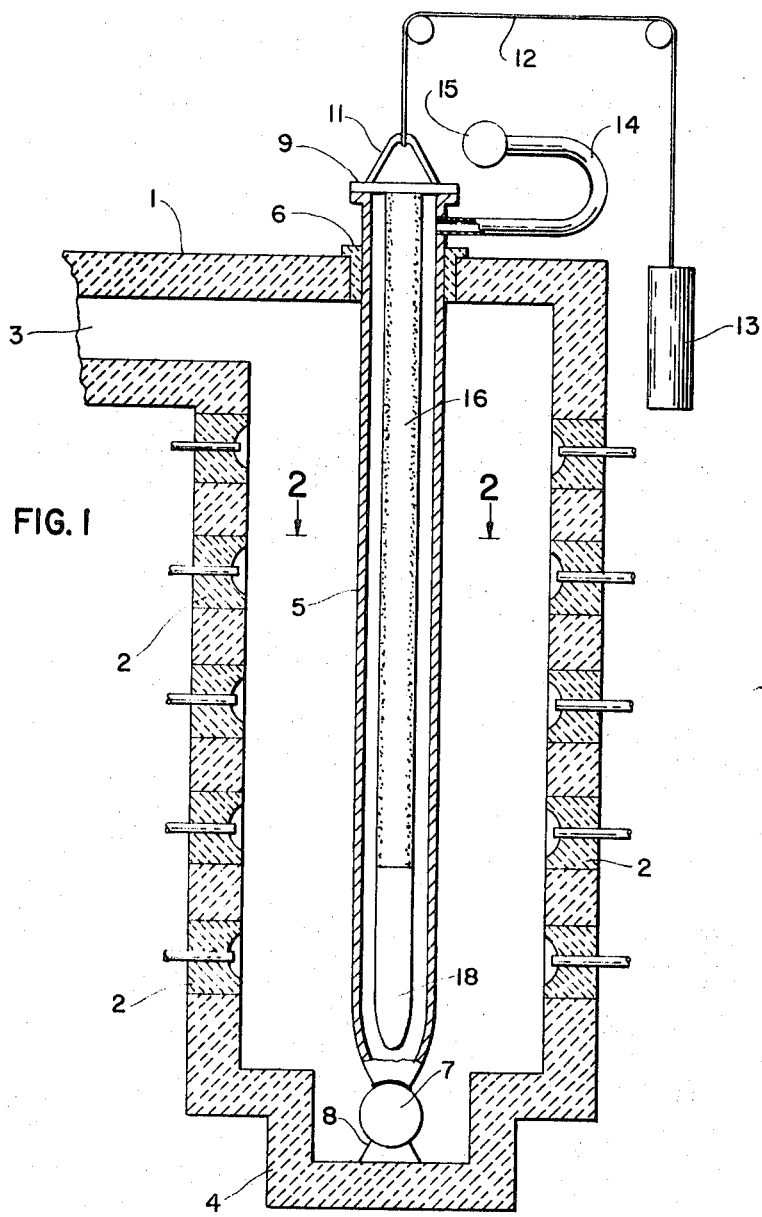
FIG. 1 is a section through a reforming furnace.

Referring to the drawings, there is shown a furnace 1 constructed in accordance with ordinary furnace practice which includes a substantially rectangular furnace chamber that extends in a direction perpendicular to the drawing. This furnace is heated to reacting temperature by a series of rows of radiant type burners 2 with the products of combustion being withdrawn from the furnace chamber through an exhaust opening 3 to a stack. The burners are operated in a conventional manner with, generally, the rows of burners being regulated together in order to control the temperature of the reformer tube. In addition, the products of combustion passing from the exhaust opening to the stack are used to preheat the reactants in a conventional manner.

Reformer tubes 5 are mounted vertically in a row through the furnace substantially midway between the side walls in which the burners are located. The number of tubes used will depend upon the size of the installation. Each of the reformer tubes is mounted at its lower end on a manifold 7 and its upper end extends with a sliding fit through a collar 6 located in the top wall of the furnace. Exhaust manifold 7 rests on a series of saddles 8 that are located in a depressed portion 4 formed in the floor of the furnace. Each of the tubes is provided with a flange on its upper end by which it is attached to a cap 9 provided with a bale 11. As the tube expands and contracts due to changes in heat, the expansion is taken up by means of a cable 12 passed over suitable pulleys with the other end of the cable being attached to a counterweight 13.

The reactants are supplied to the upper end of tube 5 through a pigtail 14 from a supply manifold 15. In a steam methane reformer the steam and methane are supplied to the reformer tube and passed in contact with a catalyst, usually nickel oxide, while they are being heated. Ordinarily, the catalyst is in particle form and is packed into the tube. In this invention, however, a catalyst 16 which can be reduced nickel oxide is formed on the surface of an axially extending core 17 which is attached to cap 9. The catalytic surface 16 of the core and the inside of tube 5 form an unobstructed annular passage for the reactants to flow through. This provides a relatively short radial path through the stream of reactants for heat transfer and it insures that the normal turbulence of high velocity flow will make the catalyst effective on the reactants without in any way impeding them in their passage through tube 5. In addition, a construction of this type will produce only a relatively minor pressure drop.

Figure 2:
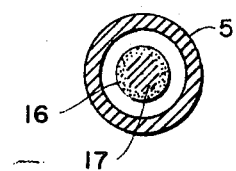
FIG. 2 is the view taken on line 2—2 showing a cross-section of the tube assembly.
Figure 3:
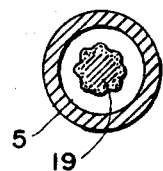
FIG. 3 is a section similar to FIG. 2 showing a modified form of tube assembly.

In FIG. 2 core 17 is shown as being a solid cylinder with a catalytic coating 16 on its surface. FIG. 3 shows the core and its coating provided on the surface with a plurality of axially extending indentations 19. These indentations increase the surface area of the core without increasing the volume. While core 17 has been shown as being solid with a catalytic coating 16 on its surface, it will be apparent that the entire core could be of catalytic material or it could be hollow as long as the ends are plugged to insure that the reactants will flow in an annular path.

Depending upon the volume of material being handled and the temperatures encountered, it may or may not be necessary to have the catalytic surface of the core extend the entire length of the tube. If this is not necessary, the lower end of the core 18 can be made of an inert material so that reaction will not continue in this portion of the furnace but the reactants will be additionally heated as they are passing toward exhaust manifold 7.

In the operation of the apparatus, methane, usually in the form of natural gas, and steam are preheated in a conventional manner to about 900° F. The steam and methane are mixed in the desired proportions and supplied to manifold 15. From there they flow through connecting tubes 14 to and through reacting tubes 5. The reacted products are collected in manifold 7 for such further treatment as is necessary or desired before use.

The reactants flowing in the annular space between the inside surface of tube 5 and the outer catalytic surface 16 of insert 17 are heated to a reacting temperature of from 1,450° to 1,650° F with the skin temperature of the tubes being maintained at about 1,900° F. The relatively thin layer of reactants in the annular path combined with turbulence produced by the flow ensures rapid heating, good contact with the catalyst, and an efficient reaction.

In current applications where reducing gas is being produced, it is necessary to use a ratio of steam to methane of no less than two to one because of the production of coke which will foul up the surface of the catalyst particles. This requires that the effluent from the reactor be cooled to remove the water vapor and then reheated to reaction temperatures. With the present reformer design where the unique catalyst construction is used, and with a thin layer of reactants to be heated, operation is possible with stoichiometric proportions of steam and methane. One set of data shows an effluent having the following composition:

Methane — 5.0
$CO_2$ — 1.2
CO — 20.4
$H_2$ — 73.4
Steam — 0

This was accomplished with a recorded outlet temperature of 1,450° F and a tubeskin temperature close to 1,900° F. Although a suitable composition of gases is obtained, the temperature of the product may be lower than desired for further use. Additional temperature of the product is easily obtained by making the lower end 18 of core 16 of completely inert material so that no additional reaction will be obtained, only additional heating of products as they pass through the last portion of the tube.

If for some reason coking should occur after a period of operation, the coke can easily be removed since the coke is accessible on the surface of the core. It is only necessary to inject steam into the tubes where it can perform its decoking function as it flows through the unobstructed annular passage in each tube. Also, with the construction shown, the reformer tubes may be horizontal. In some cases this is desirable, but is not possible when the tubes are filled with the usual type of catalyst.

It will be seen that we have provided a reactor in which full catalytic action can be obtained with a minimum of obstruction in the tubes. At the same time the configuration is such that the speed of heat transfer is increased while pressure drop is decreased.

While in accordance with the provisions of the statutes we have illustrated and described the best form of embodiment of our invention now known to us, it will be apparent to those skilled in the art that changes may be made in the form of the apparatus disclosed without departing from the spirit and scope of the invention set forth in the appended claims, and that in some cases certain features of our invention may be used to advantage without a corresponding use of other features.

What is claimed is:

1. A tube assembly for use in hydrocarbon reactions that can be catalytically promoted which comprises in combination an elongated alloy tube having an entrance for reactants at one end and an exit for reaction products at the opposite end, a solid core smaller in diameter than the inner diameter of said tube and having a continuous surface and being substantially the same length as said tube, means to mount said core concentrically in said tube thereby to form an annular passage, a portion of said core extending from said one end of said tube having on its surface a catalyst useful in the reforming of hydrocarbons, the remaining portion of said core extending from said opposite end of said tube having a surface of an inert material whereby any reactions initiated in said tube will be initiated only along said first mentioned portion of said core.

2. The combination of claim 1 in which said tube extends vertically and said means to mount said core is attached to the upper end thereof.

3. The combination of claim 1 in which the catalyst is a reduced nickel oxide.

4. The combination of claim 1 in which said core is cylindrical in cross-section.

5. The combination of claim 1 in which said core is substantially cylindrical in cross-section with axially extending indentations on its surface.

* * * * *